(12) United States Patent
Hesterman

(10) Patent No.: US 11,239,745 B2
(45) Date of Patent: Feb. 1, 2022

(54) POWER CONVERTER INCLUDING A RECIRCULATING SNUBBER

(71) Applicant: Aerojet Rocketdyne, Inc., Sacramento, CA (US)

(72) Inventor: Bryce L. Hesterman, Redmond, WA (US)

(73) Assignee: AEROJET ROCKETDYNE, INC, Redmond, WA (US)

( * ) Notice: Subject to any disclaimer, the term of this patent is extended or adjusted under 35 U.S.C. 154(b) by 0 days.

(21) Appl. No.: 17/045,607

(22) PCT Filed: Apr. 11, 2018

(86) PCT No.: PCT/US2018/027085
§ 371 (c)(1),
(2) Date: Oct. 6, 2020

(87) PCT Pub. No.: WO2019/199299
PCT Pub. Date: Oct. 17, 2019

(65) Prior Publication Data
US 2021/0091664 A1    Mar. 25, 2021

(51) Int. Cl.
*H02M 1/34* (2007.01)
*H02M 7/06* (2006.01)
*H02M 1/00* (2006.01)

(52) U.S. Cl.
CPC ............ *H02M 1/34* (2013.01); *H02M 7/06* (2013.01); *H02M 1/0048* (2021.05); *H02M 1/0077* (2021.05); *H02M 1/346* (2021.05)

(58) Field of Classification Search
CPC ........ H02M 1/34; H02M 1/342; H02M 1/344; H02M 7/06; H02M 7/062; H02M 1/0048; H02M 1/0051; H02M 1/0077; H02M 1/346
See application file for complete search history.

(56) References Cited

U.S. PATENT DOCUMENTS

| 4,533,836 A | * | 8/1985 | Carpenter | ......... H02M 3/33561 307/11 |
| 5,461,297 A | | 10/1995 | Crawford | |
| 5,875,103 A | * | 2/1999 | Bhagwat | ............. H02M 3/3376 363/17 |

(Continued)

OTHER PUBLICATIONS

International Preliminary Report on Patentability for International Application Application No. PCT/US2018/027085 dated Oct. 22, 2020.

(Continued)

*Primary Examiner* — Adolf D Berhane

(57) ABSTRACT

A power converter includes a first rectifier circuit having a pair of first rectifier circuit output terminals and a second rectifier circuit having a pair of second rectifier circuit output terminals, a snubber circuit comprising a first diode and a first capacitor connected to each other at a first node and connecting the pair of first rectifier circuit output terminals, a second diode and a second capacitor connected to each other at a second node and connecting the pair of second rectifier circuit output terminals, a third diode connecting the first node to one of the pair of second rectifier output terminals, and a fourth diode connecting the second node to one of the pair of first rectifier output terminals.

15 Claims, 2 Drawing Sheets

(56) References Cited

U.S. PATENT DOCUMENTS

| | | | | |
|---|---|---|---|---|
| 6,980,447 B1* | 12/2005 | Schaible | ........... | H02M 3/33592 |
| | | | | 363/56.05 |
| 2001/0002171 A1* | 5/2001 | Abdoulin | .......... | H02M 3/33561 |
| | | | | 363/89 |
| 2007/0195566 A1* | 8/2007 | Nielsen | ................... | H02M 3/28 |
| | | | | 363/53 |
| 2011/0057639 A1* | 3/2011 | Chung | .................... | H02M 1/34 |
| | | | | 323/311 |
| 2013/0223112 A1 | 8/2013 | Damazio-Coelho et al. | | |
| 2017/0307013 A1* | 10/2017 | Salmia | ................ | F16C 32/0457 |

OTHER PUBLICATIONS

International Search Report and Written Opinion for International Application No. PCT/US2018/027085 dated Nov. 29, 2018.

* cited by examiner

POWER CONVERTER INCLUDING A RECIRCULATING SNUBBER

STATEMENT REGARDING FEDERALLY SPONSORED RESEARCH OR DEVELOPMENT

This invention was made with government support under contract number NNC16CA21C awarded by NASA. The government has certain rights in the invention.

TECHNICAL FIELD

The present disclosure relates generally to power converters, and more particularly to power converters including a recirculating snubber circuit.

BACKGROUND

Electrical power converters are used in multiple applications to convert power from a first set of voltage and current characteristics to a second set of voltage and current characteristics. Use of the power converters allows a single power source, such as a battery or other stored energy component, to power multiple different electronic components each of which may have a different power requirement.

One exemplary type of power converter, referred to as a step-up converter, includes multiple stacked rectifier sections in order to achieve a higher output voltage. Each of the rectifier sections includes a bridge rectifier, as well as circuitry connecting the bridge rectifier to a voltage output. Previous high-voltage bridge rectifiers have been constructed utilizing silicon carbide diodes. However silicon carbide based diodes are not suitable for usage in some environments, such as outer space, due to their sensitivity to radiation.

SUMMARY OF THE INVENTION

In one exemplary embodiment a power converter includes a first rectifier circuit having a pair of first rectifier circuit output terminals and a second rectifier circuit having a pair of second rectifier circuit output terminals, a snubber circuit comprising a first diode and a first capacitor connected to each other at a first node and connecting the pair of first rectifier circuit output terminals, a second diode and a second capacitor connected to each other at a second node and connecting the pair of second rectifier circuit output terminals, a third diode connecting the first node to one of the pair of second rectifier output terminals, and a fourth diode connecting the second node to one of the pair of first rectifier output terminals.

In another example of the above described power converter the first capacitor is connected to the one of the pair of first terminals not connected to the third diode and the second capacitor is connected to the one of the pair of second terminals not connected to the fourth diode.

In another example of any of the above described power converters a filter circuit includes a first filter inductor connecting the one of the pair of first terminals not connected to the third diode to a midpoint node, and a second filter inductor connecting the one of the pair of second terminals not connected to the fourth diode to the midpoint node.

In another example of any of the above described power converters each of the first rectifier circuit and the second rectifier circuit are one of a full bridge rectifier and a center tapped rectifier.

In another example of any of the above described power converters the each of the first rectifier and the second rectifier comprises a plurality of silicon diodes.

In another example of any of the above described power converters each of the first rectifier circuit and the second rectifier circuit rectify currents from transformers driven by a multi-phase power system.

In another example of any of the above described power converters each of the first rectifier circuit and the second rectifier circuit is substantially identical to each other pair of rectifier sections.

An exemplary method for reducing voltage spikes in a power converter includes recirculating snubber energy through a snubber circuit comprising a first diode and a first capacitor connected to each other at a first node and connecting the pair of first rectifier circuit output terminals, a second diode and a second capacitor connected to each other at a second node and connecting the pair of second rectifier circuit output terminals, a third diode connecting the first node to one of the pair of second rectifier output terminals, and a fourth diode connecting the second node to one of the pair of first rectifier output terminals.

Another example of the above described method for reducing voltage spikes in a power converter further includes filtering a voltage between a high voltage output node and a low voltage output node using a third capacitor connecting the high voltage output node to a midpoint node and a fourth capacitor connecting the low voltage output node to the midpoint node.

In another example of any of the above described exemplary methods for reducing voltage spikes in a power converter the first capacitor and the second capacitor have approximately the same capacitance.

Another example of the above described power converters having a multiphase power system includes drivers that may be selectively operated in a pulse width modulated mode or a phase shifted bridge mode.

In another example of the above described power converters, each rectifier receives power from at least one transformer that has a primary winding.

In another example of the above described power converters, the voltage across each primary winding is limited by clamping diodes.

These and other features of the present invention can be best understood from the following specification and drawings, the following of which is a brief description.

DETAILED DESCRIPTION OF AN EMBODIMENT

Figure 1:
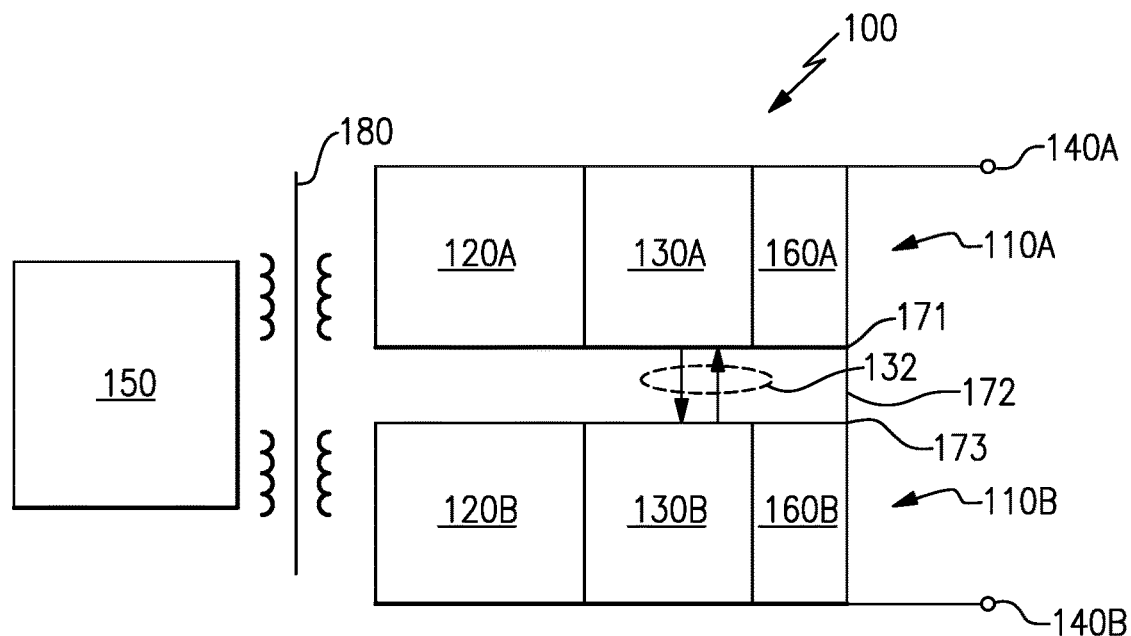
FIG. 1 illustrates a power converter including multiple stacked rectifier sections.

FIG. 1 schematically illustrates a power converter 100 including multiple stacked rectifier sections 110A and 110B. Each of the rectifier sections 110A and 110B includes a bridge circuit 120A and 120B constructed of diodes (see 220A and 220B in FIG. 2) connected to a snubber circuit 130A and 130B, a voltage output 140A and 140B, and an output filter 160A and 160B. Paired with the rectifier sections is a corresponding driver 150 that drives current through transformer 180 to the bridge rectifier sections 110A and 110B. Driver 150 can be a single driver or multiple drivers, depending on the needs of a given application. Similarly, the transformer 180 can be a single transformer or multiple transformers, depending on the needs of the given application.

The rectifier sections 110A and 110B are mirrored, and include a snubber recirculation circuit 132 configured to pass a snubber current from each snubber section 130A or 130B to a corresponding mirrored snubber circuit 130B or 130A. In order to make the bridge rectifier rad-hard (more resistant to radiation), a bridge rectifier can be constructed utilizing silicon based diodes instead of other diodes such as those made of silicon carbide. Silicon based diodes, however, have a longer switch-off time, referred to as a reverse recovery time, and can cause spikes in the output voltage of the bridge rectifiers. The snubber circuits 130A and 130B operate to limit the amplitude of the spikes in the output voltage of the rectifier circuits 120A and 120B.

Snubber circuits 130A and 130B mitigate the voltage spikes caused by the reverse recovery time of the diodes in the rectifier circuits 120A and 120B. Some existing snubber circuits mitigate the voltage spikes by dissipating substantial amounts of power, resulting in the generation of substantial amounts of heat energy. In space applications, as well as any similar environment, the dissipation of the heat energy is difficult.

Some alternative snubber circuits mitigate the reverse recovery time by recycling the energy. These types of snubber circuits are referred to as "lossless" snubber circuits, despite some small amount of energy dissipation. Some lossless snubber circuits utilize an active switching of one or more transistors within the snubber circuit, and require active controls, which add complexity to the overall system.

In yet further existing lossless snubber circuits, additional inductors are incorporated to allow for passive snubbing, however this increases the weight and cost of the snubber circuit.

In contrast to the existing examples, the mirrored snubber circuits 130A and 130B of FIG. 1 avoid the need for added transistors or inductors by utilizing a mirrored construction. The output filter circuits 160A and 160B are mirrored with respect to output filter inductor connections (see FIG. 2) such that the output filter inductor of filter circuit 160A is connected to a low voltage connection of rectifier circuit 120A and the output inductor of filter circuit 160B is connected to the high voltage connection of rectifier circuit 120B. An output inductor of one filter section 160A is connected to the negative output terminal 171 of the rectifier section 130A being connected to a midpoint node 172. The output inductor of the other of the rectifier sections 110B is connected to the positive output terminal 173 of the rectifier section 130B being connected to the midpoint node 172. This configuration can alternately be referred to as being connected in series between output terminals 140, with the high voltage output of one being connected to the low voltage output of the other, in order to increase the output voltage across the output terminals 140.

Figure 2:
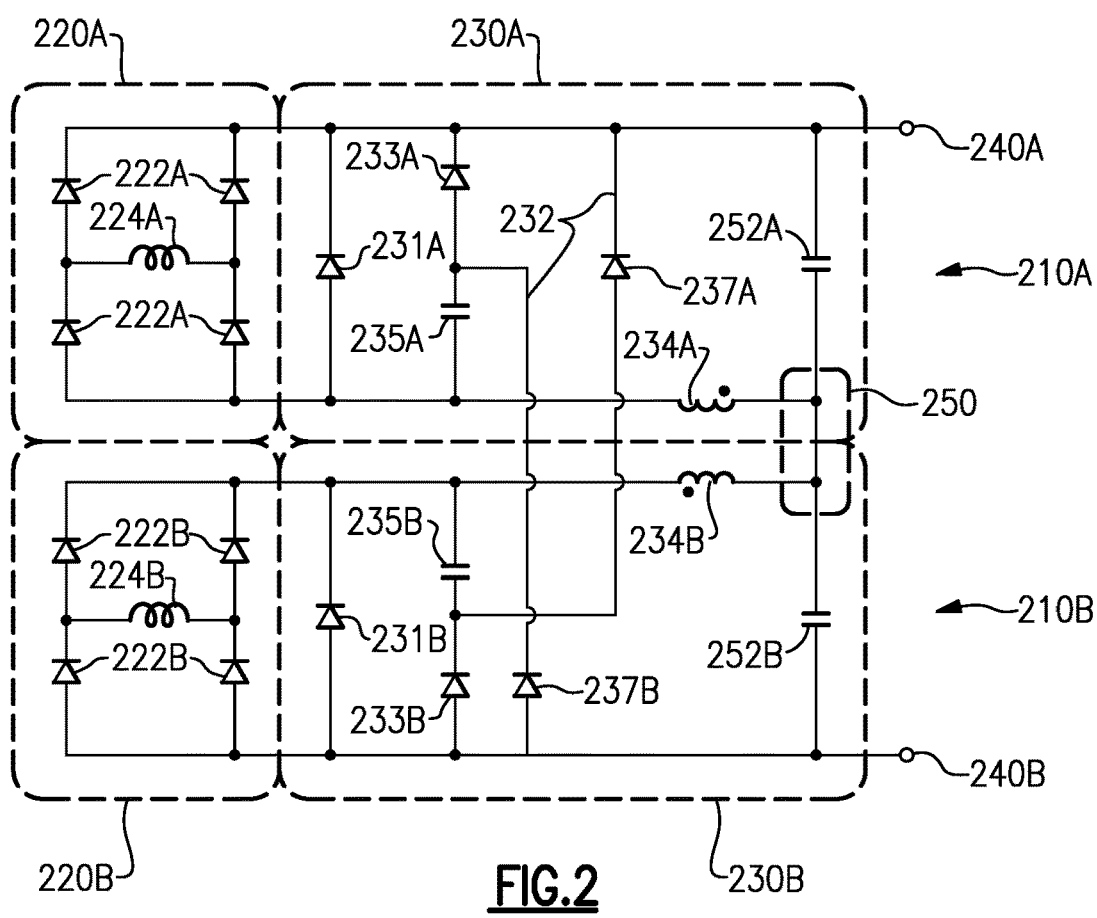
FIG. 2 schematically illustrates exemplary mirrored rectifier sections such as could be utilized in conjunction with FIG. 1.

With continued reference to FIG. 1, FIG. 2 schematically illustrates rectifier sections 210A, 210B, such as could be used for the rectifier sections 110A, 110B of FIG. 1, in more detail. As with FIG. 1, each of the rectifier sections 210A, 210B includes a diode bridge portion constructed of multiple diodes 222A, 222B arranged in a full bridge configuration about a transformer coil 224A, 224B. In alternative configurations, the full bridge rectifiers 220A, 220B can be replaced with alternative rectifier types, such as center-tapped rectifiers and the like. Similarly, the corresponding full bridge driver 150 (see FIG. 1) could be replaced with any other type of driver.

Each of the rectifier sections 210A, 210B further includes a snubber/filter circuit 230A, 230B. In some cases, such as the illustrated example, a diode 231A, 231B can be included parallel to the snubber/filter circuit 230A, 230B. The diode 231A, 231B is a freewheeling diode that improves the power converter efficiency by reducing power losses during the time intervals when the transformer output voltage is zero. Parallel to the first diode 231A, 231B is a snubber diode 233A, 233B and snubber capacitor 235A, 235B connected in series with each other and connecting the positive and negative outputs of the bridge circuit 220A, 220B. As the rectifier sections 210 are mirrored relative to each other, the order of the snubber diode 233A, 233B and the snubber capacitor 235A, 235B in the two snubber/filter circuits 230A, 230B is reversed, with the snubber diode 233A, being connected to a high side in the first (upper) snubber/filter circuit 230A, and the snubber diode 233B being connected to the low side in the second (lower) snubber/filter circuit 230B.

A node connecting each snubber diode 233A, 233B to the corresponding snubber capacitor 235A, 235B is connected to the opposite snubber/filter circuit 230A, 230B of the opposite rectifier section 210A, 210B via the recirculation circuit 232 comprised of snubber diodes 237A and 237B, with the node of the upper snubber/filter circuit 230A being connected to a low side of the lower snubber/filter circuit 230B through snubber diode 237B and the node of the lower snubber/filter circuit 230B being connected to the high side of the upper snubber/filter circuit 230A through snubber diode 237A.

Each of the snubber/filter circuits 230A, 230B further includes a filter inductor 234A, 234B. The filter inductor 234A, 234B of the upper snubber/filter circuit 230A is on a low side of the snubber/filter circuit 230A, and the filter inductor 234B of the lower snubber/filter circuit 230B is on a high side of the snubber/filter circuit 230B. Each of the filter inductors 234A, 234B is connected to a midpoint node 250. The midpoint node 250 is connected to each of the high and low voltage outputs 240A, 240B via corresponding substantially identical capacitors 252, such that the capacitors 252 define a voltage differential between the high and low voltage outputs 240A, 240B. In some examples, the connections used for the capacitors 252, as well as the rectifier sections 220A, 220B, are low impedance connections.

Mirroring the rectifier sections 210A, 210B, as described above, facilitates the inclusion of the snubber diodes 237A, 237B in the recirculation circuit 232. The snubber diodes 237A, 237B in turn recirculate the energy from each snubber/filter circuit 230A, 230B during the process of clamping voltage spikes into the opposite, mirrored, snubber/filter circuit 230A, 230B. By recirculating the energy, substantially less energy is required to be dissipated and no active switching is required in the snubber/filter circuits 230A, 230B. The snubber diodes 237A, 237B in the recirculation circuit 232 suppress the voltage spikes appearing at the outputs of full bridge rectifiers 220A, 220B by transferring energy into the snubber capacitors 235A, 235B. Diodes 233A, 233B reset the snubber capacitor 235A, 235B voltages during the time intervals when the voltages across transformer windings 224A, 224B are essentially zero by transferring energy stored in the snubber capacitors 235A, 235B to the output terminals 240A and 240B. In some examples, the mirrored rectifier sections 210 are included in a circuit having low-inductance connections.

By recirculating the current through mirrored snubber/filter sections 230A, 230B, as in the example of FIGS. 1 and 2, recirculation of energy can be achieved without requiring an additional recirculation inductor in each snubber/filter circuit 230A, 230B. This reduces the weight and cost, and can be particularly beneficial for applications having tight weight allowances and/or requiring substantial certification of each component, such as a satellite or other space based circuit.

In some applications, a greater range of operation at full output power than can be achieved via a single bridge driver 150 is required. Exemplary systems capable of achieving the greater full power operating range include dual full bridge converters capable of being operated in either a known Pulse Width Modulation (PWM) mode or a known phase shifted bridge mode.

Figure 3:
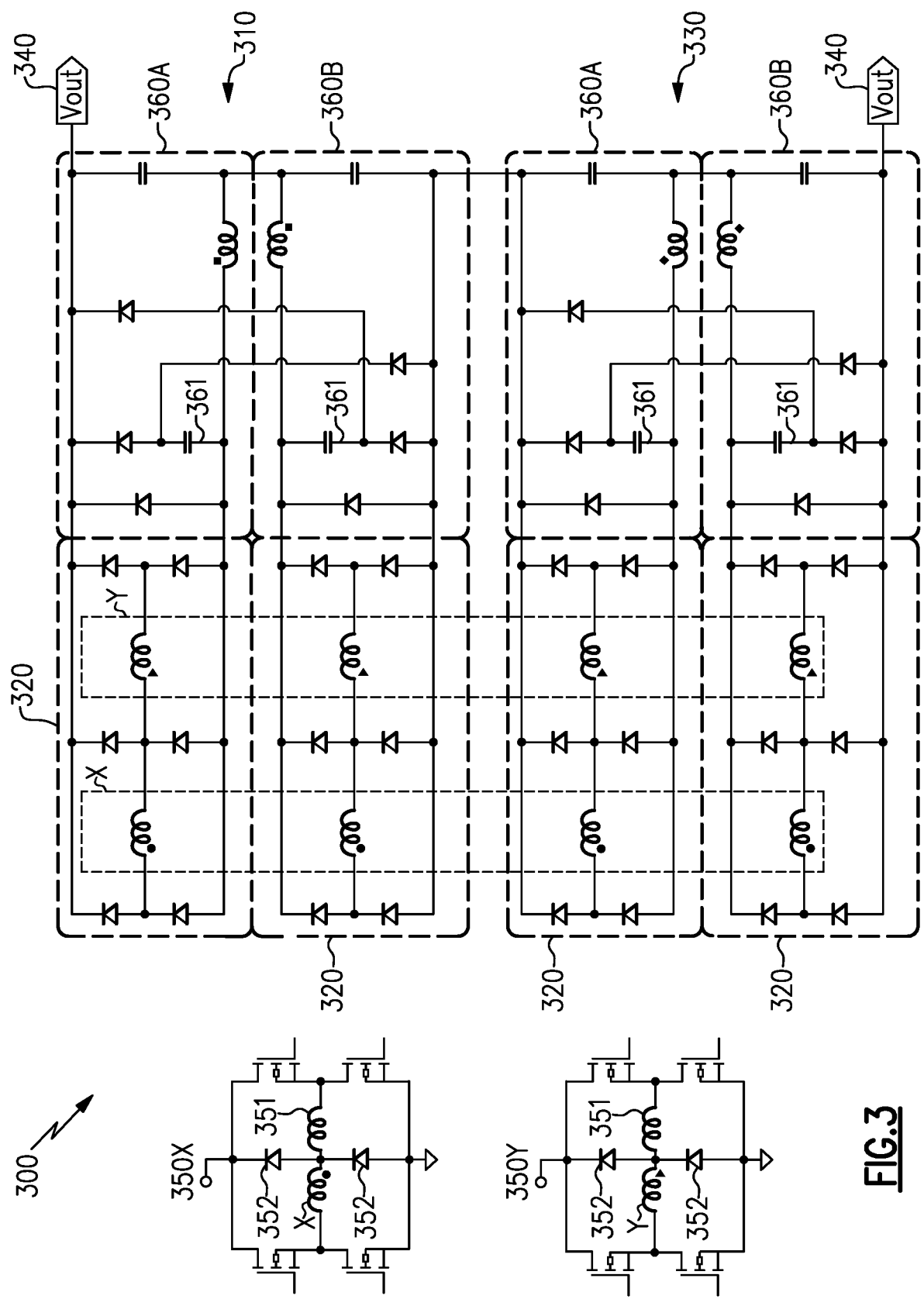
FIG. 3 schematically illustrates an alternate mirrored rectifier section for utilization in a dual full bridge converter.

FIG. 3 schematically illustrates an example dual full bridge converter 300 including two full bridge drivers 350X, 350Y and two sets of mirrored rectifier sections 310, 330. Full bridge driver 350X drives a transformer X, and full bridge driver 350Y drives a transformer Y thereby forming a multi-phase power system. Each of the sets of mirrored rectifier sections 310, 330 are substantially similar to the rectifier sections 210A and 210B of FIG. 2, with the exception that the bridge circuits 320 are multi-phase bridge circuits that each rectify the voltages from the two transformers X and Y, whereas the bridge circuits 220A and 220B of FIG. 2 are single-phase bridge circuits.

Each of the mirrored snubber/filter sections 360A, 360B are connected to a corresponding bridge circuit 320, and are configured identical to the snubber/filter circuits 230A, 230B illustrated in FIG. 2. To increase the voltage between the output nodes 340, the two sets of mirrored rectifier sections 310, 330 are connected in series, with the low side of 310 being connected to the high side output of 330, resulting in a voltage output that is about twice the voltage output of either mirrored rectifier section individually. In another example, only one of mirrored rectifier sections 310, 330 is connected between output terminals 340, similar to the arrangement shown in FIG. 2.

In yet further examples, additional rectifier sections, beyond the two rectifier sections 310, 330 illustrated in FIG. 3 can be utilized in series, thereby providing additional voltage increases at the output nodes 340. Similarly, multiple circuits of the types shown in FIGS. 1 and 2 may be connected in series to provide a higher output voltage.

When high output currents at lower output voltages are desired, full bridge drivers 350X and 350Y are operated in a PWM mode with the voltage waveforms across transformers X and Y being out of phase. This causes the currents produced by bridge rectifiers 320 to be equal to the sum of the currents produced by the individual secondary windings of transformers X and Y that are connected to each bridge rectifier. When operating in a PWM mode, the voltage between output nodes 340 is regulated by adjusting duty cycle of full bridge drivers 350X, 350Y.

When high output voltages at lower output currents are desired, full bridge drivers 350X, 350Y are operated in a phase shifted bridge mode with the voltages across transformers X and Y being at nearly 100 percent duty cycle, but with an adjustable phase relationship. Maximum output voltage occurs when full bridge drivers 350X, 350Y are operated in phase and the voltages across the secondary windings of transformers X and Y add to produce about twice the voltage between output nodes 340 than can be produced when operating in a PWM mode with the voltage waveforms across transformers X and Y being out of phase.

In yet further examples, full bridge drivers 350X and 350Y include inductors 351 and diodes 352. Inductors 351 can be used to facilitate a known highly-efficient mode of operation commonly called zero-volt-switching. When the duty cycle of the full-bridge drivers falls below 50 percent, inductors 351 can resonate with snubber capacitors 361, which reduces the effectiveness of the snubbers in clamping the output voltages of rectifiers 320. Including clamping diodes 352 in the full bridge drivers limits the voltage across the primary windings of transformers X and Y to the input voltage supplied to the bridge drivers, and thereby restores the effectiveness of the snubbing while still allowing zero-volt-switching to occur.

Transformers can be designed to have high leakage inductances in order to facilitate zero-voltage switching as an alternative to using separate primary inductors 351, but the high leakage inductance implementation does not allow clamping diodes 352 to be used, and therefore it provides less optimal snubber effectiveness when the duty cycle is below fifty percent.

In yet further examples, driver 150 in FIG. 1 may be implemented with a full bridge driver utilizing clamping diodes and an inductor in an arrangement to similar to diodes 352 and inductor 351 in 350X and 350Y to enhance the effectiveness of the snubber circuits in FIGS. 1 and 2 for operating conditions in which the duty cycle is less than 50 percent.

In some examples, filter inductors 234A and 234B are coupled as shown by the polarity dots as shown in FIG. 2. In some further examples, the filter inductors shown in FIG. 3 that have matching polarity dots are coupled with the indicated polarities.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A power converter comprising:
a first rectifier circuit having a pair of first rectifier circuit output terminals and a second rectifier circuit having a pair of second rectifier circuit output terminals;
a snubber circuit comprising a first diode and a first capacitor connected to each other at a first node, the first diode and the first capacitor being connected in series and the series connected first diode and first capacitor connect the pair of first rectifier circuit output terminals, a second diode and a second capacitor connected to each other at a second node, the second diode and the second capacitor being connected in series and the series connected second diode and second capacitor connect the pair of second rectifier circuit output terminals, a third diode connecting the first node to a low voltage output of the pair of second rectifier output terminals, and a fourth diode connecting the second node to a high voltage output of the pair of first rectifier output terminals.

2. The power converter of claim 1, wherein the first capacitor is connected to the one of the pair of first terminals not connected to the third diode and the second capacitor is connected to the one of the pair of second terminals not connected to the fourth diode.

3. The power converter of claim 1, wherein said snubber circuit further includes a first filter inductor connecting the one of the pair of first terminals not connected to the third diode to a midpoint node, and a second filter inductor connecting the one of the pair of second terminals not connected to the fourth diode to the midpoint node.

4. The power converter of claim 1, wherein each of the first rectifier circuit and the second rectifier circuit are one of a full bridge rectifier and a center tapped rectifier.

5. The power converter of claim 1, wherein the each of the first rectifier and the second rectifier comprises a plurality of silicon diodes.

6. The power converter of claim 1, wherein each of the first rectifier circuit and the second rectifier circuit rectify currents from transformers driven by a multi-phase power system.

7. The power converter of claim 6 in which the multi-phase power system includes drivers that may be selectively operated in either a pulse width modulated mode or a phase shifted bridge mode.

8. The power converter of claim 1, comprising a plurality of pairs of rectifier sections wherein each of the first rectifier circuit and the second rectifier circuit is substantially identical to each other corresponding rectifier section.

9. The power converter of claim 1 in which each rectifier receives power from at least one transformer that has a primary winding.

10. The power converter of claim 9 in which the voltage across each primary winding is limited by clamping diodes.

11. The power converter of claim 1, wherein the first node is a node of an upper portion of the snubber circuit and is connected to a low side of a lower portion of the snubber circuit through the third diode and the node of the lower snubber circuit is connected to a high side of the upper snubber circuit through the fourth diode, and a midpoint node connects a low voltage output of the first rectifier circuit to a high voltage output of the second rectifier circuit.

12. A method for reducing voltage spikes in a power converter comprising:

recirculating snubber energy through a snubber circuit comprising a first diode and a first capacitor connected to each other at a first node, the first diode and the first capacitor being connected in series and the series connected first diode and first capacitor connecting a pair of first rectifier circuit output terminals, a second diode and a second capacitor connected to each other at a second node, the second diode and the second capacitor being connected in series and the series connected second diode and second capacitor connecting a pair of second rectifier circuit output terminals, a third diode connecting the first node to one of the pair of second rectifier output terminals, and a fourth diode connecting the second node to one of the pair of first rectifier output terminals.

13. The method of claim 12, further comprising filtering a voltage between a high-voltage output node and a low-voltage output node using a third capacitor connecting the high voltage output node to a midpoint node and a fourth capacitor connecting the low voltage output node to the midpoint node.

14. The method of claim 12, wherein the first capacitor and the second capacitor have approximately the same capacitance.

15. the method of claim 12, wherein the first node is a node of an upper portion of the snubber circuit and is connected to a low side of a lower portion of the snubber circuit through the third diode and the node of the lower snubber circuit is connected to a high side of the upper snubber circuit through the fourth diode, and a midpoint node connects a low voltage output of a first rectifier circuit to a high voltage output of a second rectifier circuit.

* * * * *